US005455288A

United States Patent [19]
Needham

[11] Patent Number: 5,455,288
[45] Date of Patent: Oct. 3, 1995

[54] DUSTLESS COLOR CONCENTRATE GRANULES

[76] Inventor: Donald G. Needham, Rt. 1, Box 300, Ramona, Okla. 74061

[21] Appl. No.: 188,447

[22] Filed: Jan. 26, 1994

[51] Int. Cl.$^6$ ................................................. C08K 9/02
[52] U.S. Cl. .................... 523/205; 524/399; 524/585; 524/586; 524/587; 428/403; 428/407
[58] Field of Search .......................... 523/205; 524/399, 524/585, 586, 587; 428/403, 407

[56] References Cited

U.S. PATENT DOCUMENTS

| | | | |
|---|---|---|---|
| 4,127,421 | 11/1978 | Ferrill, Jr. ................................. | 106/433 |
| 4,173,492 | 11/1979 | Pollard ...................................... | 106/415 |
| 4,285,994 | 8/1981 | Pearce et al. ........................... | 427/222 |
| 5,139,915 | 8/1992 | Moffat et al. ........................... | 430/110 |
| 5,204,208 | 4/1993 | Paine et al. ............................. | 430/137 |

*Primary Examiner*—Paul R. Michl
*Assistant Examiner*—John J. Guarriello
*Attorney, Agent, or Firm*—Timothy R. Kroboth

[57] ABSTRACT

A novel coating process for making dustless color concentrate in granular form, is provided. The granules are individual resin particles coated with pigment and binder.

12 Claims, No Drawings

DUSTLESS COLOR CONCENTRATE GRANULES

FIELD OF THE INVENTION

This invention relates to color concentrates, and in particular to color concentrate granules.

BACKGROUND OF THE INVENTION

Processes for making dust-free, free-flowing, pigment products are exemplified by U.S. Pat. Nos. 4,127,421 to Ferrill, Jr. and 4,285,994 to Pearce et al. In an aqueous process, granules are formed by agitating an aqueous slurry of pigment often including a waxy material or polymeric material melting below 100° C. , and surfactant. By the aqueous process of Ferrill, Jr., essentially spherical granules having a diameter between about 0.5 and 1 mm, and containing more than 70 wt. % lead chromate, may be formed. The process provides a hydrocarbon-type resin in molten form, requires a cationic surfactant, and may use an anionic surfactant which may be sodium stearate.

By the process of Pearce et al, powdered pigment may be tumbled with a wax composition having an average particle size typically ranging between 300 and 500 microns, and with a suitable oil or liquid surfactant, to produce a product containing more than 70 wt. % pigment. Hot and cold granulation of cadmium pigment are described.

Also known as illustrated by U.S. Pat. No. 4,173,492 to Pollard, is a process for preparing coated pigment particles by mixing pigment and a suitable molten coating agent, cooling the resulting mixture to produce a solid mass, and breaking the solid mass into flakes. By the process of Pollard, presscake pigment is mixed with molten hydroxystearate wax having a melting point in the range of 52° C. to 88° C., under high shear conditions, to eventually provide flakes having a pigment loading in excess of 75%.

Despite the foregoing, commercially available, color concentrate is usually supplied in the form of pellets measuring approximately one-eighth inch by one-eighth inch. Typically, these pellets are formed by crossblending selected pigments, preblending the resulting pigment blend with a base resin, and hot melt compounding in specialized equipment such as a single screw or twin screw extruder, to pelletize. For coloring, the pellets are dispersed in a selected natural resin at a let down ratio usually ranging from one part of concentrate to from five to fifty parts of natural resin. However, it is known to be a difficult task to obtain good color uniformity when using color concentrate pellets, at a let down ratio of 50:1.

There continues to be a need to let down color concentrates at a ratio in excess of 50:1, for instance at a ratio of 60 or 70:1. Accordingly, an improved color concentrate is needed. The color concentrate should be dustless and advantageously will have good pourability. Improved dilution and dispersion characteristics of the color concentrate, when blended with natural resin, are necessary to provide color uniformity.

SUMMARY OF THE INVENTION

In accordance with the present invention, a dustless color concentrate that meets the foregoing requirements, is provided. The concentrate is in the form of granules including individual resin particles beneficially coated with binder and pigment.

To provide the color concentrate granules, a mixture of pigment, particulated resin and suitable binder is prepared. The resin and binder are selected so that the resin advantageously has a higher melting point than the binder. By a process in accordance with the invention, the mixture, while being agitated, is beneficially heated to a desired temperature near the melting point of the binder, and below the melting point of the resin.

Generally speaking, a tackifying temperature will be sufficient; however, the temperature may be at or in excess of the melting point of the binder. By the term "tackifying temperature" is meant a temperature that causes the binder to become tacky or sticky.

As a result, a dustless mixture of individual resin particles coated with pigment and binder is produced. Thereafter, the coated resin particles are allowed to cool and a dustless color concentrate is recovered.

Advantageously, in accordance with the process, the mixture may be provided near the desired temperature by friction heating, so that binder preferentially adheres to the resin particles and pigment. To this end, a blending device such as a ribbon blender may be beneficially used.

Beneficially, the mixture includes a suitable processing aid for preventing agglomeration of pigment, and sticking or agglomeration of the color concentrate granules. In this way, preparation of free flowing granules having good pourability, is benefitted.

DETAILED DESCRIPTION OF THE INVENTION

As indicated above, the present invention relates to color concentrate granules, and especially to dustless, free-flowing granules of small, fairly uniform particle size with improved dilution and dispersion characteristics, when the color concentrate is let down. By a process in accordance with the present invention, color concentrate granules are provided without using an aqueous slurry of pigment.

It has now been found that the foregoing dustless color concentrate granules may be readily attained by a coating process wherein a mixture including pigment, particulated resin, and suitable binder, is subjected to a temperature near the melt temperature of the binder so as to enable the binder to become tacky and/or molten for containing the pigment and for adhering to the particulated resin.

Both organic and inorganic pigments are suitable for use in this invention, and may be used in combination. Commonly used organic pigments include phthalocyanines, azo pigments, diazo pigments, isoindolinone, quinacridone and carbazole pigments. Commonly used inorganic pigments include titanium dioxide, zinc oxide, carbon black, iron oxide and ultramarine blue. Pigments of less common use include fluorescent, pearlescent and phosphorescent pigment materials, mica and metallic flake.

The pigment will conveniently be in powdered form and should have a mean particle size between about 0.1 and 100 microns, preferably between about 0.2 and 20 microns. The most preferred mean particle size for organic pigments is about 0.2 to 0.3 micron. The most preferred mean particle size for inorganic pigments is about 15 to 20 microns.

The pigment loading will typically range from about 5 to 50 wt. %, and is generally determined by the particular pigment selected and the end use application. As indicated, a mixture of pigments may be used.

Organic polymers are suitable for use as the particulated resin, which in effect serves as the base resin. These polymeric materials are well known and include polyolefins such as polyethylene and polypropylene, polystyrene, polyvinyl chloride, ethylene vinyl acetate, and copolymers thereof.

In forming granules in accordance with the present invention, it is important that the polymeric material selected to be the particulated resin, remain in the solid state. To this end, the polymer selected should have a sufficiently high melting point; otherwise, the polymer may be selected from the vast array of organic polymers, provided that when blended therewith, the polymer is compatible with the resin into which the color concentrate is let down.

A suitable mesh size for the particulated resin will generally be within the range of about 10 to 50 mesh, U.S. sieve size, with a preferred particle size being typically within the range of about 20 to 40 mesh for a high let down ratio and good pourability. Accordingly, it may be understood that the particulated resin is beneficially of substantially greater particle size than the pigment. Generally speaking, selection of a relatively higher mesh, particle size will benefit a relatively higher let down ratio.

As will be understood, use of resin particles of substantially uniform size also benefits a high let down ratio by contributing to the formation of color concentrate granules of uniform size. For sake of illustration, an approximately 35 mesh color concentrate granule may be formed from a 35 mesh resin particle.

The level of particulated resin in the granule-forming mixture may range from about 40 to 90 wt. %, with a major amount of resin typically being used. A preferred loading may be within the range of about 50 to 80 wt. %. As can be understood, the loading selected, as well as the polymer selected for use as the particulated resin, is often determined by the end use of the color concentrate granules.

Beneficially, a binder is used that has a freeze point above the range of 100° F. to about 120° F. Otherwise, agglomeration of the color concentrate granules may result from softening of the binder under high temperature, storage conditions. On the other hand, it is generally advantageous for the binder to have a low melting point so that energy and time requirements for producing a tacky or molten state of the binder during granule formation, are minimized. Accordingly, a suitable melting point for the binder will typically exceed 120° F. and be less than about 190° F. However, depending upon economic considerations, the binder may have a melting point in excess of 220° F. In any event, the particulated resin must have a higher melting point than the binder.

In accordance with the invention, during granule formation, the binder becomes tacky and may melt to form a liquid phase. Useful binders within the foregoing description are well known, and include waxy type materials which may be based on long-chain, i.e., about $C_8$ to $C_{24}$, fatty acids or alcohols, including esters and amides thereof such as fatty acid amides; microcrystalline waxes; polyglycols having a average molecular weight in excess of about 1000, typically about 1500–3000, such as methoxy polyethylene glycol (MW 2000); and polyolefins. Fatty amides such as erucamide are especially useful as the wax binder when the color concentrate granules are to be used in rotomolding processing.

The loading of binder in the granule-forming mixture will typically range from about 2 to 20 wt. %. A preferred loading may be within the range of about 5 to 10 wt. %. As can be understood, the loading selected, will vary depending upon factors including the particular pigment and other constituents used and amounts thereof, but in any event, the amount used will be sufficient to produce dustless granules.

By the invention, the binder beneficially becomes tacky and may melt to form a liquid phase, mixes with the pigment and other additives to advantageously provide a uniform mixture, and adheres to, and forms a coating of the mixture around, individual resin particles to yield color concentrate granules. Advantageously, the binder provides a uniform dispersion of the pigment. Beneficially, the binder eliminates pigment dust and may encapsulate pigment particles.

Beneficially, a granule-forming mixture in accordance with the present invention, includes a processing aid that prevents agglomeration of pigment, and sticking or agglomeration of the color concentrate granules. Thus, preparation of free flowing granules having good pourability is assisted.

Processing aids of this type include well known, fatty acid salts of $C_{10}$ to $C_{20}$ fatty acids such as stearic acid, and cationic moieties such as Group IA, IIA, IIB, and IIIA metal cations. Advantageously, this additive is solid at room temperature, has a higher melting point than the binder, and remains solid during processing. Illustrative lubricating surfactants of this type include sodium stearate, calcium stearate, magnesium stearate and zinc stearate. Zinc stearate, which has a melting point of about 250° F., is a preferred lubricating surfactant for use in the present invention.

The loading of this processing aid will typically be at an about 1:2 ratio to binder. Accordingly, the loading will range from about 1 to 10 wt. %, with a preferred loading generally being within the range of about 2 to 5 wt. %. The loading selected, will vary depending upon factors including the particular pigment and other constituents used and amounts thereof. For sake of example, it may be beneficial to use a relatively higher loading ratio when polyisobutylene or microcrystalline wax is the binder. A mixture of lubricating surfactants may be used.

The temperature utilized in forming the color concentrate granules will vary depending upon the particulated resin and binder selected. Beneficially, the temperature will be near, that is, within about 10° to 30° F. of, the melting point of the binder, but in any event, must not melt the particulated resin. Generally speaking, a tackifying temperature will be sufficient. Typically, the temperature will be below the glass transition temperature of the particulated resin. Accordingly, the temperature will normally be below about 250° F., generally below about 200° F., to tackify and/or melt the binder yet maintain the resin in particulate form.

By using a granule-forming temperature close to the melting point of the binder, energy may be conserved and processing time may be minimized. Accordingly, the temperature selected may vary not only with the binder and particulated resin, but also with the desired speed of operation of the process.

Moreover, by using a binder having a low melting point, and hence making possible a granule-forming temperature of less than about 200° F., friction heat may be used. To this end, the color concentrate granules may be advantageously prepared in a low shear, blending device such as a ribbon blender.

Beneficially, friction heat results in the granule-forming mixture being at a higher temperature than the container holding the mixture. As a result, the binder preferentially sticks to the resin particles. By comparison, if an external heat source were used to melt the binder, binder may preferentially coat the container inner surface and be lost from the granule-forming process. As a result, the product may not be dustless.

Advantageously, the degree of agitation and blending time are selected to ensure adequate mixing of the binder, pigment and other constituents, and sufficient heat to produce a dustless mix. When friction heat is used, a uniform mixture is generally produced by the time the binder melts. Typically, a commercially available ribbon blender can handle a batch up to about 500 pounds in about 30 minutes or less.

If a temperature less than the melting point of the binder is used during granule-forming, it will be understood that the binder will advantageously be of smaller, typically significantly smaller, particle size than the particulated resin.

Antioxidants may be included in color concentrate granules according to the present invention. Suitable antioxidants are those generally used to stabilize plastic resins against thermal degradation. Commonly known antioxidants include phosphites such as tris(2,4-di-t-butylphenyl)phosphite (I-168) and bis(2,4-di-t-butylphenyl) pentaerythritol diphosphite (MDW-626), hindered phenolics such as tetrakis[methylene-3-(3', 5'-di-t-butyl-4'-hydroxy phenyl)-propionate]methane (I-1010) and octadecyl-3-(3,5-di-t-butyl-4-hydroxyphenyl) propionate (I-1076), thioesters such as dilauryl thiodipropionate (DLTDP), distearyl thiodipropionate (DSTDP) and trilauryl trithiophosphite (TLTTP), and butylated hydroxy toluene. These stabilizers may be used separately or in combination.

The loading of antioxidant will typically range from about 0.5 to 2 wt. %. A mixture of antioxidants may be and is often used. The loading will vary depending primarily upon the type of downstream processing to be used.

Ultraviolet stabilizers may be included in color concentrate granules according to the present invention. These stabilizers are particularly beneficial for those applications where extended outdoor exposure to sunlight may occur. Suitable ultraviolet stabilizers include benzophenone and benzotriazole light absorbers and hindered amine light stabilizers such as poly[[(6-morpholino-s-triazine-2,4-diyl) [(2, 2,6,6-tetramethyl-4-piperidyl)imino]hexamethylene[[(2,2,6, 6-tetramethyl-4-piperidyl)imino]] (UV3346). Loading of the stabilizer will typically range from about 5 to 20 wt %, with an about 5 to 10% loading being generally preferred. A mixture of UV stabilizers may be used.

In the examples that follow and throughout this description, all parts and percentages are weight percent unless otherwise specified.

EXAMPLE 1

A mixture of pigments (9.7%), particulated resin (71.5%), binder (5.1%), zinc stearate (2.5%), UV stabilizer (10.2%) and antioxidant (1%) is added to a Beardsly-Piper ribbon blender. The pigments consist of 1.76% titanium dioxide, 2.65% carbon black, 2.64% diazo yellow and 2.64% phthalocyanine green. The particulated resin is 35 mesh HDPE commercially available from Mobil as HMA-047. The binder is a fatty acid amide commercially available as Kemamide "E" from Witco, chemically known as erucamide. The UV stabilizer is Cyanamid UV-3346 hindered amine. The antioxidant is a mixture of Ciba Geigy Irganox 1076 and Irgafos 168.

The batch size is 500 lbs. The mixture is agitated for approximately 30 minutes, by which time the temperature of the mix increases by friction heat to 150° F. (as measured by a thermocouple located at the shell of the blending device), the mixture becomes dustless, and an evenly dispersed mix is obtained. Thereafter, the mixture is discharged from the blender as free-flowing granules. Upon cooling to room temperature, the granules remain dustless and free-flowing.

EXAMPLE 2

The ingredients of Example 1 are added to a Day Mixer shell, at room temperature, approximately 80° F. The batch size is 25 lbs. The mixture is blended for 30 minutes, by which time the temperature of the mix increases by friction heat to 140° F. (as measured by a thermocouple located at the shell of the blending device) and the mix becomes dustless. Thereafter, the mixture is discharged. The inside of the mixer shell is found to be relatively clean other than for minor staining from some of the pigments. The granules are dustless and free-flowing.

The color concentrate granules are let down at a ratio of 50:1 in polyethylene, and melt blended in an extruder to pelletize. The color is found to be good and to be uniform.

COMPARATIVE EXAMPLE

The process of Example 2 is repeated except that the mixer shell is pre-heated to 140° F., and except that the mixture is blended for 15 minutes. The inside of the mixer shell is found to be heavily coated with binder and other ingredients, which has to be scraped off, and the mixer shell has to be cleaned before another batch may be run.

The concentrate is let down at a ratio of 50:1 in polyethylene, and melt blended in an extruder to pelletize. The color is found to be light.

EXAMPLE 3

The process of Example 1 is repeated, except that the binder is a microcrystalline wax having a melting point of 128° F., available from Glyco. The resulting granules are dustless but have poor flow characteristics.

EXAMPLE 4

The process of Example 1 is repeated, except that the binder is polyisobutylene rubber having a molecular weight of 2000. The resulting granules are dustless but have poor flow characteristics.

As may be understood, color concentrate granules in accordance with the present invention, will typically have a smaller particle size than commercially available, color concentrate pellets. Advantageously, granules in accordance with the invention, for instance 35 mesh granules, may be diluted and dispersed in downstream processing, at a let down ratio of as high as 75 to 100:1. A let down ratio of 75:1 has been achieved using an extruder having a length/diameter ratio of 24/1 and a let down ratio of 100:1 has been attained in an extruder with a length/diameter ratio of 32:1

The present invention may be carried out with various modifications without departing from the spirit or essential attributes thereof, and accordingly, reference should be made to the appended claims, rather than to the foregoing specification as indicating the scope of the invention.

I claim:

1. A process for making dustless color concentrate granules, said process comprising preparing a mixture comprising pigment, particulated resin, and a suitable binder having a freeze point in excess of 100° F., said particulated resin having a higher melting point than said binder, and said binder being used in an amount sufficient to produce dustless granules; heating said mixture by agitation wherein friction heating is used, to a temperature of less than about 200° F., said temperature being near the melting point of said binder and being suitable to cause said binder to have a physical condition selected from tacky and molten, and said temperature being below the glass transition temperature of said resin, to yield individual resin particles coated with said pigment and binder; and allowing the resulting coated resin particles to cool and recovering a dustless color concentrate.

2. The process of claim 1, wherein said mixture comprises an effective amount of a processing aid for preventing agglomeration ok said pigment and sticking or agglomeration of the granular color concentrate, said processing aid being a solid at room temperature and having a higher melting point than said binder.

3. The process of claim 1, wherein said resin is high density polyethylene.

4. The process of claim 1, wherein said binder is erucamide.

5. The process of claim 2, wherein said processing aid is zinc stearate.

6. The process of claim 1, wherein said binder has a melting point in excess of 120° F.

7. The process of claim 1, wherein said temperature is a binder-tackifying temperature.

8. The process of claim 1, wherein said binder is a long chain, fatty acid amide.

9. The process of claim 2, wherein said processing aid is a salt of stearic acid and a cation selected from Group 1A, IIA, IIB and IIIA metal cations.

10. A process for making dustless color concentrate granules, said process comprising preparing a mixture comprising pigment, particulated resin, and a suitable binder having a melting point in excess of 120° F., said particulated resin having a higher melting point than said binder, said binder being used in an amount sufficient to produce dustless granules, and said binder a long chain fatty acid amide; heating said mixture by agitation wherein friction heating is used, to a temperature of less than about 200° F., said temperature being near the melting point of said binder and being suitable to cause said binder to have a physical condition selected from tacky and molten, and said temperature being below the glass transition temperature of said resin, to yield individual resin particles coated with said pigment and binder; and allowing the resulting coated particles to cool and recovering a dustless color concentrate.

11. The process of claim 10, wherein said temperature is a binder-tackifying temperature.

12. The process of claim 10, wherein said mixture comprises an effective amount of a processing aid for preventing agglomeration of said pigment and sticking or agglomeration of the granular color concentrate, said processing aid being a solid at room temperature and having a higher melting point than said binder.

* * * * *